United States Patent Office 2,817,435
Patented Dec. 24, 1957

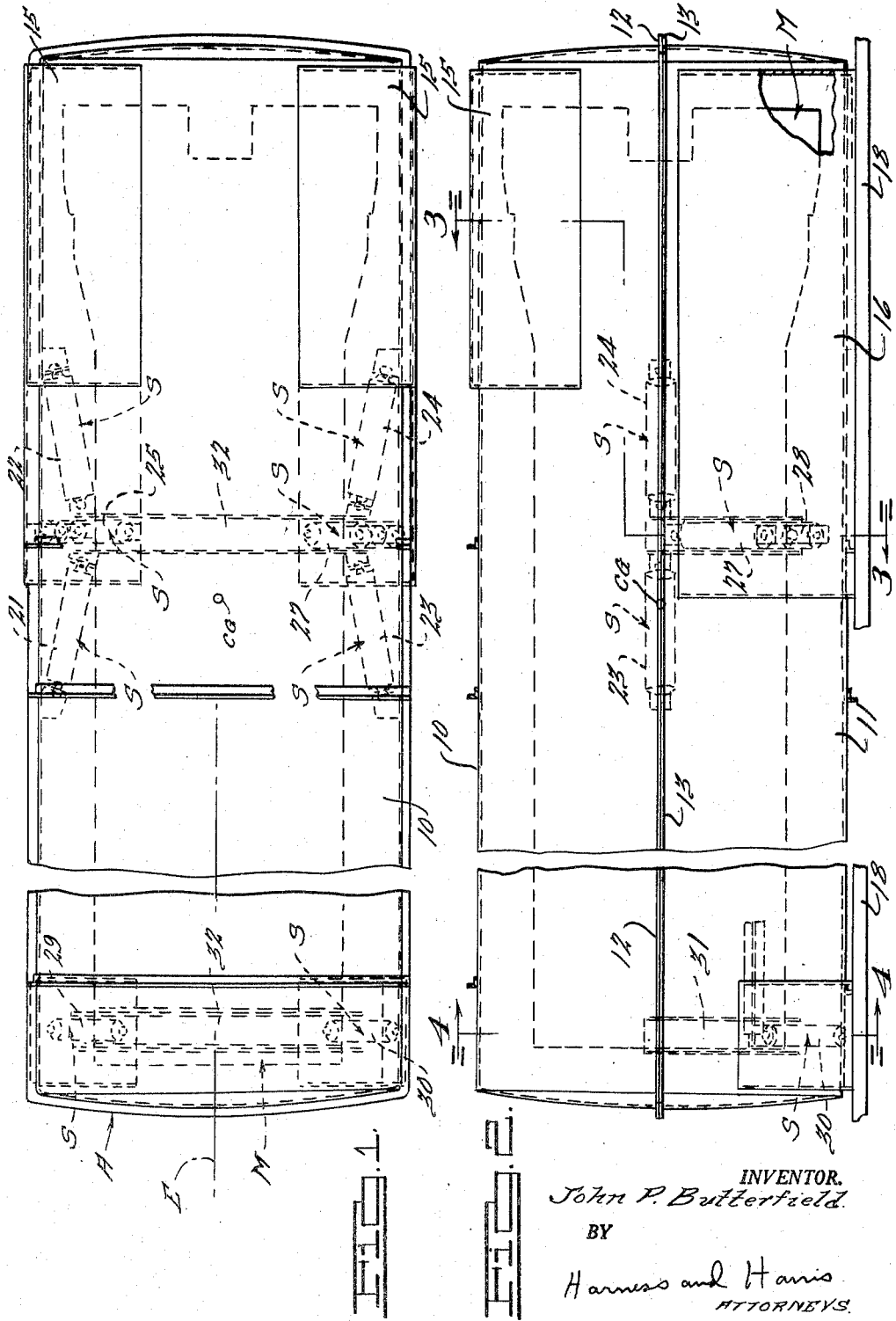

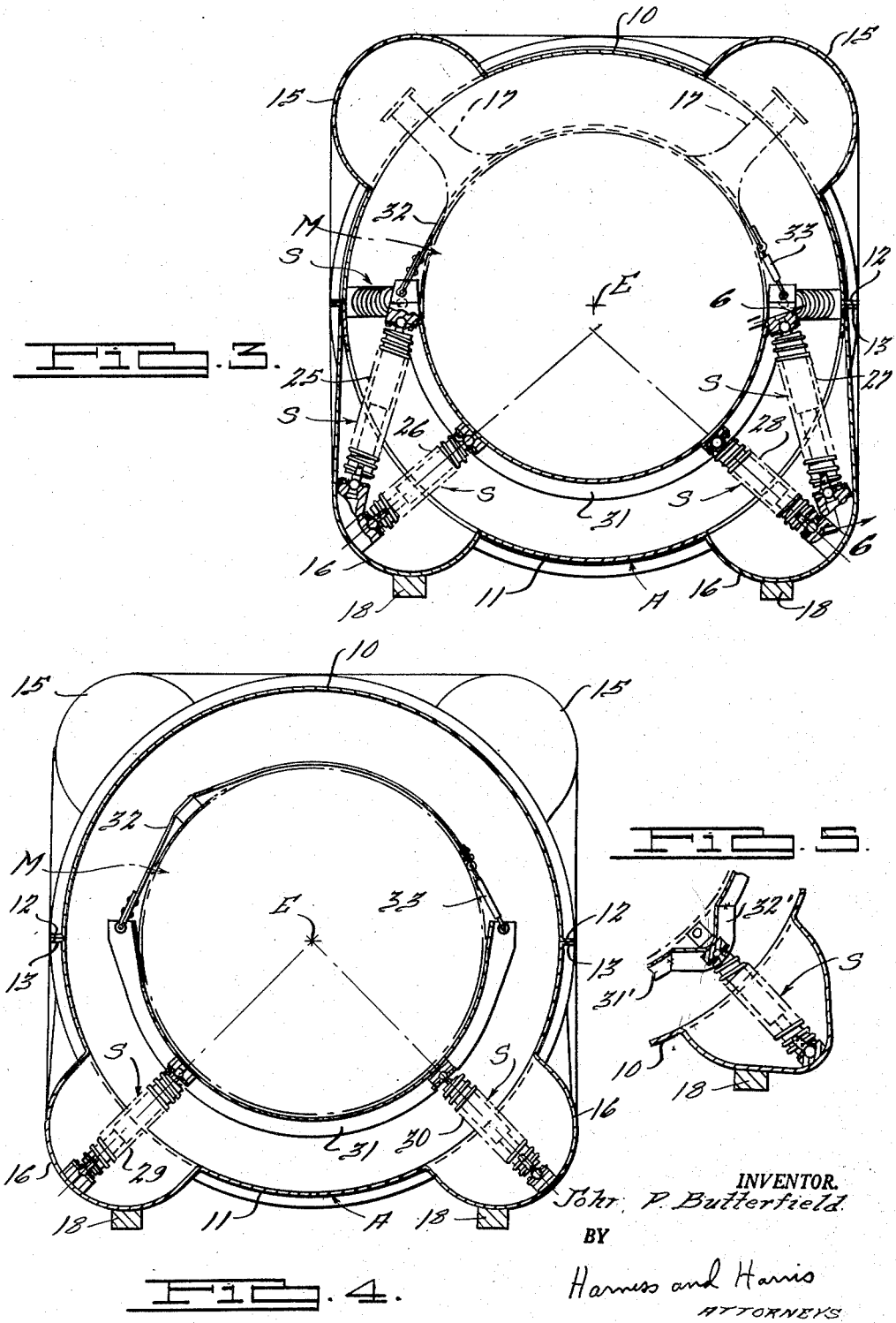

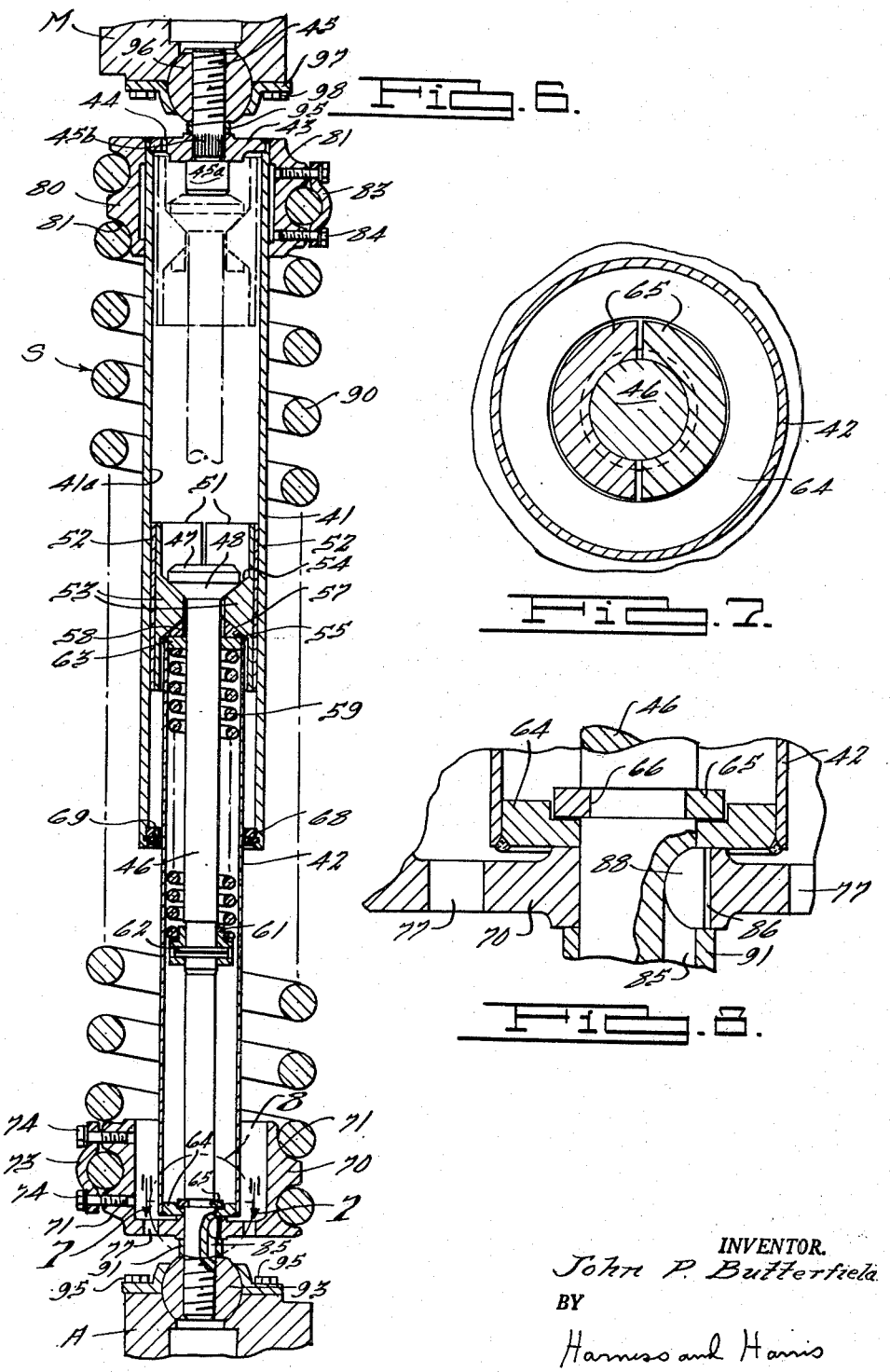

2,817,435

CONTAINER WITH VIBRATION DAMPING SUPPORT MEANS

John P. Butterfield, Grosse Pointe Park, Mich., assignor to Chrysler Corporation, Highland Park, Mich., a corporation of Delaware Application October 9, 1953, Serial No. 385,249

3 Claims. (Cl. 206—46)

This invention relates to containers and particularly to containers having means to resiliently suspend a relatively heavy object within the container walls and to isolate the suspended object from vibration and shock. This invention is twofold in that it not only relates to the combination of the container and its article suspension means but also concerns the spring-snubber article suspension units per se.

It is a primary object of this invention to provide a relatively large container having an improved article suspension means mounted on the container inner walls that will resiliently suspend a relatively large, heavy object within the container and isolate it from vibration and/or shock.

It is another object of this invention to provide an improved spring-snubber unit adapted to resiliently support an object in both tension and compression said unit including a relatively constant force friction damping means that isolates the spring-snubber supported object from vibration while protecting it from shock.

It is still another object of this invention to provide an improved form of combination spring-snubber unit that is relatively simple in design, economical to manufacture and install, durable in construction and reliable in operation over a very wide temperature range.

It is still another object of this invention to provide a container adapted for use as a shipping crate wherein article suspension means are arranged within the container in an improved manner such that the article mounted on said suspension means will be isolated from vibration and shock.

Other objects of this invention will become readily apparent from a reading of the following description and a consideration of the related drawings wherein:

Fig. 1 is a top plan view of the container embodying this invention, certain portions of the container being broken away for the sake of clarity;

Fig. 2 is a side elevational view of the container unit shown in Fig. 1;

Fig. 3 is a sectional elevational view of the container shown in Figs. 1 and 2, this view being taken along the line 3—3 of Fig. 2;

Fig. 4 is a sectional elevational view of the container shown in Figs. 1 and 2, this view being taken along the line 4—4 of Fig. 2;

Fig. 5 is an enlarged, fragmentary, sectional elevational view of a modified form of connection for one or both ends of the spring-snubber units used to mount an article within the container;

Fig. 6 is an enlarged sectional elevational view of one of the spring-snubber units used to mount an article within the container, this view being taken along the line 6—6 of Fig. 3;

Fig. 7 is an enlarged, fragmentary, sectional elevational view taken along the line 7—7 of Fig. 6; and Fig. 8 is an enlarged, fragmentary, sectional elevational view of that portion of the lower end of the spring-snubber unit that is within the circle 8 of Fig. 6.

In the drawings the letter A represents the hollow, substantially cylindrical, tube-like container in which is resiliently supported the article or body M. Article M may be any type of article even though the container A and its article mounting means S are particularly designed to provide a shipping container for an article that might include sensitive, breakable mechanism that must be isolated from both vibration and shock. The container A is preferably made from two, closed end, semi-cylindrical shell portions 10, 11 each of which has flanges 12 and 13 respectively about its peripheral edges. Flanges 12, 13 are adapted to be connected together by suitable means after the article M has been mounted within the lower shell portion 11 of the container A. The portion of the container A extending from the location of substantially the center of gravity CG leftward to its left end (see Figs. 1, 2, and 4) is substantially a true cylinder whereas the portion of the container A to the right of the center of gravity CG comprises a cylindrical portion with four radially spaced, substantially semi-cylindrical, protuberances 15, 16 mounted on and projecting from its outer side. The protuberances 15, 16 provide space within the container A adapted to receive fin-like projections 17 that are formed on the right end of the article M. The lower substantially semi-cylindrical half shell 11 of the tube-like container A is provided with skids 18. The shells 10, 11 of the container A may be made from cast or sheet metal, plastic or resinous compounds, wood, impregnated paper fibres or the like, or from any material that will have the requisite strength to protect the article M.

Mounted within the container A at a number of predetermined locations are the spring-snubber units S that resiliently suspend the article M from the container inner walls and limit its movement in all directions. These spring-snubber units S act both in tension and compression and include damping means to damp out vibrations of the resiliently suspended article M. It will be noted from Figs. 1–3 that the majority of the spring-snubber units S are located somewhere near the center of gravity CG of the article M and that they are arranged in such a manner as to limit movement in all directions. In the particular instance shown spring-snubber units 21, 22, 23 and 24 extend longitudinally of the container A in a horizontal plane that passes through the center of gravity CG of the article M. Each of the pair of snubbers 21, 22 and 23, 24 is located on opposite sides of the container A and the snubbers of each pair of units are arranged to converge inwardly towards the article M so that their center point is a point adjacent the center of gravity CG. This particular arrangement of the horizontally extending snubbers 21, 22, 23, 24 provides a support in the plane of the center of gravity of the article M that prevents yawing of the article M under axially directed shock or vibratory loads. The article M may have a number of collars 31 mounted about it by means of band straps 32 and turnbuckles 33. The collars 31 provide means whereby one of the ends of the associated spring-snubber units S may be pivotally connected to the article M. Obviously the spring-snubbers S could be connected directly to the article M or some other type of collar mount used. The strap type collar mount shown forms no part of this invention so further description thereof is not considered necessary. The opposite ends of the spring-snubbers S each include a ball formation that is adapted to be mounted in a mating socket so as to provide a universal pivoting connection at each end of each spring-snubber unit. One of the sockets for each spring-snubber unit end is mounted on the inner wall of the container A while the other socket is mounted on the article M or its attached collar 31.

In addition to the four longitudinally extending spring snubber units 21–24, there are four transversely extending spring-snubber units 25, 26, 27, 28 that are located in a vertically extending plane that contains the points of convergence of the spring-snubbers 21–24. As previously pointed out this plane is at about the center of gravity CG of the article M. As can be readily seen from Fig. 3, the four spring-snubber units 25, 26, 27 and 28 are arranged in two pairs of two each on opposite sides of the container A. Each pair 25, 26 and 27, 28 are connected to the article M at spaced apart points and arranged to converge towards a point on the adjacent container inner wall. From Fig. 3 it will be noted that spring-snubbers 26, 28 converge towards the center of gravity CG of the article M but that they do not pass through the center axis E that contains the center of gravity CG. However, as the units 26, 28 are placed under tension the lines of action thereof tend to approach intersection with the axis through the center of gravity CG and thus the stability of the suspension tends to increase. It is thought to be obvious from Fig. 3 that the spring-snubber units 25 and 27 are longer than the spring-snubber units 26 and 28. However, except for the difference in length, the construction of all of the spring-snubber units S is identical. This particular spring-snubber construction is described in detail hereafter and is specifically covered by the copending divisional application of John P. Butterfield, Serial No. 450,766, filed August 18, 1954.

In addition to the eight (8) spring-snubber units 21–28 that are located at about the center of gravity CG of the article M, there are also two (2) spring-snubber units 29 and 30 (see Fig. 4) that are located at the left end of the container A. These two (2) spring-snubber units 29, 30 extend transversely of the article M in a substantially vertically extending plane. As was the case with the spring-snubber units 21–28, the spring-snubber units 29 and 30 are connected between a collar 31 attached to the article M and points located on the inner walls of the container A. It will be noted that the spring-snubber units 29, 30 are arranged so that they converge towards the center E of the cross sectional area of the article M. From a consideration of Figs. 1–4, it will be noted that the spring-snubber units are arranged such that certain units have their lines of action passing adjacent the center of gravity of the body M while other of the units act along lines that are in the planes passing through the geometrical center of the body M. While the particular arrangement of the spring-snubber units herein disclosed is preferred for the particular article shown, still, this invention is not to be considered to be limited to any specific spring-snubber arrangement. Obviously many factors such as weight, shape, degree of article movement permissible, and the like, could control the spring-snubber arrangement within the container A.

Fig. 5 shows a modified form of connection between an end of a spring-snubber unit S and an article mounted collar 31'. In this construction the collar 31' has a V-shaped bracket 32' fixed thereto by welded or similar connection and the adjacent end of the associated spring-snubber unit S is pivotally connected to the apex portion of the V-shaped bracket 32'. In this manner shorter spring-snubber units may be used. Various size brackets will permit the use of the same length spring-snubber units S throughout the container.

The particular spring-snubber unit S utilized in this container construction is shown in detail in Figs. 6–8. This spring-snubber unit S is designed so as to take loadings both in tension and compression and it includes friction type damping means to control any tendencies for vibration of the article suspended within the container A by the several spring-snubber units S. The spring-snubber unit S comprises an outer tube-like barrel 41 and an inner, telescopically arranged, tube-like barrel 42. The upper end of the outer barrel 41 is closed by a plug 43. Plug 43 is pierced by an air vent bore 44 and has its center portion pierced by an opening that receives the threaded stud 45. The stud 45 has an enlarged head portion 45a, located within barrel 41, that provides a stop for the reciprocable plunger rod 46 in one of its limiting positions. This limiting position is indicated by the broken lines in Fig. 6. The threaded shank of the stud 45 is formed along a portion of its length with serrations 45b that are adapted to be fixedly engaged with the encircling portions of the plug 43 to prevent relative rotation between the stud 45 and the plug 43. The plug 43 is fixedly connected to the upper end of the outer barrel 41 by welding or any equivalent type of connection.

Mounted in and extending axially of the outer barrel 41 is the plunger rod 46. Plunger rod 46 has an enlarged head portion 47 at its upper end that is formed with a plurality of flat, radially spaced, beveled, wedging faces 48. The purpose of these wedging faces 48 will become readily apparent from the following description.

Encircling the headed end 47 of the plunger rod 46 and arranged concentrically within the outer barrel 41 are a plurality of friction shoes 51. Each of these sleeve-type shoes 51 has an outer surface that is a segment of a cylinder shaped to matingly fit the arcuate inner wall 41a of the outer barrel 41. Shoes 51 each have their outer surfaces lined with a suitable friction material 52 that may be similar to conventional friction brake band or clutch disc material. Projecting radially inwardly from the inner or concave surface of each of the sleeve type friction shoes 51 is a double faced wedge ramp 53. Each ramp 53 has a pair of flat, converging ramp surfaces 54 and 55 respectively. The upper ramp surface 54 of each of the shoe ramps 53 is shaped to be engaged in face-to-face contact with one of the wedging faces 48 formed on the headed end 47 of the plunger rod 46. The lower ramp surface 55 of each of the shoe ramps 53 is shaped to be engaged in face-to-face contact with beveled upper surface 57 of the washer-like wedge ring 58. Wedge ring 58 is slidably mounted on the plunger rod 46 so that it may be pressed into engagement with the shoe wedge ramp surfaces 55 by the precompressed coil spring 59.

The coil spring 59, that is threaded around the plunger rod 46, is maintained in a precompressed state by the washer-like collar 61 that is fixedly connected to the plunger rod 46 by the pin 62. The upper end of the compressed spring 59 bears against a thrust washer 63 that is floatingly mounted on the plunger rod 46. Due to the high degree of precompression of the spring 59 the friction shoes 51 are continually forced radially outwardly against the inner surface 41a of the outer barrel 41 with a substantially constant force irrespective of variation in the load applied to the spring-snubber unit S. This friction vibration damping force remains substantially constant due to the fact that the usual forces that are applied to the spring-snubber unit S are not sufficient to cause additional compression of the precompressed spring 59. The manner of mounting the spring 59 on the plunger rod 46 maintains the precompression of the spring 59 regardless of the loading applied to the spring-snubber unit S.

Encircling the lower portion of the plunger rod 46 and the precompressed spring 59 is the inner barrel 42. This inner barrel 42 has its lower end fixedly connected to the outer periphery of a washer element 64 (see Fig. 8) by a weld connection. The barrel mounted washer element 64 is also anchored to the lower end of the plunger rod 46 by means of the split ring washer 65 (see Figs. 7 and 8) and by the cup-like collar 70. The mounting of the collar 70 in rod 46 will be subsequently described.

The plunger rod 46 is provided with a reduced neck portion 66 (see Fig. 8) to receive the split washer 65. Washer 65 thus prevents movement of the inner barrel 42 axially of the plunger rod in a direction towards the headed end 47 of the plunger rod 46. As will be evident from a consideration of Fig. 6 and from the subsequent description, the collar 70 prevents movement of the inner barrel 42 in the opposite axial direction. The upper end of the inner barrel 42 is designed to encircle and bear against the thrust washer 63 at the upper end of the spring 59. It will be noted that washer 63 is not fixedly connected to the upper end of the inner barrel 42 but merely matingly fits within the barrel 42 to act as a guide ring therefor. The lower end of the outer barrel 41 is provided along its inner surface with a washer-like guide ring 68 (see Fig. 6). This guide ring 68 may be a bronze bushing or the like and it is anchored in position in the lower end of outer barrel 41 by means of a snap type retainer ring 69. As the guide ring 68 extends between the inner surface 41a of the outer barrel 41 and the outer surface of the inner barrel 42 and the guide ring 63 between the plunger rod 46 and the inner barrel 42, it is thought to be obvious that the guide rings 63, 68 provide means that restrains tilting or buckling of the plunger rod 46 with respect to both the inner and outer barrels 42, 41. This insures that each of the friction shoes 51 will be continuously operable to accomplish its intended vibration damping action.

Encircling the upper end of the outer barrel 41 and fixedly connected thereto by a welded connection, or the like, is a cup-like collar 80. Collar 80 has thread-like depressions 81 formed in its outer side surfaces that are adapted to threadably receive the upper end turns of a relatively large size load supporting coil spring 90. The thread-like depressions 81 provide a means for transmitting tension and compression forces between the outer barrel 41 and the coil spring 90. To prevent any relative movement between the coil spring 90 and the collar 80 there is provided a spring anchor clip 83 that is fixed to the collar 80 by the bolts 84. Clip 83 effectively anchors the upper end turns of the spring 90 to the outer side surface of the upper collar 80.

The coil spring 90 extends concentrically about the outer and inner barrels 41, 42 of the spring-snubber unit S and has its lower end turns threadably mounted in the thread-like depressions 71 formed in the outer side surfaces of the cup-like collar 70. A spring anchor clip 73 is mounted on the collar 70 by means of the bolts 73 and this anchor clip clampingly engages the lower end turns of the coil spring 90 so as to effectively prevent relative movement between these lower end turns and the collar 70. This mounting of the coil spring 90 on the snubber barrels 41 and plunger rod 46 provides a very compact effective unit.

The collar 70 at the lower end of the spring-snubber unit S is fixedly mounted on the lower end of the plunger rod 46 so that it can neither shift axially of the rod 46 nor rotate with respect thereto. The rod 46 is provided with a keyway 85 (see Fig. 8) extending longitudinally of the rod. Collar 70 is provided with a key-receiving groove 86 that is adapted to be aligned with the plunger rod keyway 85. After the keyway 85 and groove 86 have been aligned the key 88 is slidably mounted in the aligned openings 85, 86 from the lower end of the rod 46. The key 88 will then prevent relative rotation between the collar 70 and the rod 46. After mounting of the key 88 in its keyway 85 and key receiving groove 86, the sleeve-like bushing 91 is slipped over the lower end of the rod plunger rod 46 and moved up against the collar 70 so as to cover the keyway 85 and prevent loss of the key 88. Collar 91 also acts as a spacer between the collar 70 and the ball-type nut 93 that is threaded on the lower threaded end of the plunger rod 46.

Ball-type nut 93 is adapted to be received in a suitable mating socket element which may comprise a demountable socket plate 94 that is connectible to a support, such as the container A, by means of the screws 95. Obviously the support member A must be provided with a suitable recess to receive a portion of the ball-type nut 93. The bottom surface of the collar 70 may be pierced by air vent bores 77 to prevent any interference with movement of the lower end of the outer barrel 41 into the cup-like collar 70 on compression of the load supporting spring 90.

The ball and socket construction at the upper end of the spring-snubber unit S is substantially identical to that at the lower end of the unit S. A sleeve-type spacer collar 95 is mounted on the threaded shank of the stud 45 adjacent the outer side of the plug 43. Threaded on the shank of the stud 45 is a ball-type nut 96. A socket plate 97 is removably connected to the ball-type nut 96 by means of the bolts 98. The article M, to which the plate 97 is attached, has a preformed recess to receive a portion of the ball-type nut 96.

It is thought to be obvious that the spring-snubber unit heretofore described provides a coil spring 90 that interconnects the two relatively movable bodies A and M in such a manner as to resiliently support the article M on the body A. The spring 90 can take loads in both tension and compression and thus it isolates the body M from shock. Furthermore, the friction snubber unit within barrel 41 provides a rugged, reliable, damping unit to isolate the spring supported body M from vibration. Not only is the spring-snubber unit S an effective body suspension unit but it is one that is simple, relatively inexpensive, and extremely compact for the job it accomplishes. In addition it will be noted that, due to the use of friction type damping means, the spring-snubber units S are not susceptible to the difficulties encountered when hydraulic or rubber-like vibration damping means are used in similar devices that may be subjected to wide variations in temperature range.

I claim:

1. In combination, a box-like container, a substantially cylindrically-shaped body of such dimensions as to be floatingly supported within said container, and a plurality of body supporting means mounted interiorly of said container and connected between the interior walls of the container and said body, said body supporting means each comprising a resilient body supporting unit capable of transmitting forces in both tension and compression with each unit having a friction type vibration damping means associated therewith, said body supporting units each having universal pivotal connecting means at each end such that the lines of action thereof may be adjusted; certain of the body supporting means being arranged to extend transversely of the supported body so that the lines of action thereof converge towards and pass closely adjacent the center of gravity of the body, other of said body supporting means being arranged to extend transversely of the body so that the lines of action thereof converge towards and pass through the longitudinally extending centerline of the supported body and still other of said body supporting means being arranged to extend and converge towards the supported body in a plane at substantially the mid height of the supported body which plane includes the longitudinally extending centerline and the center of gravity of the supported body.

2. A body and a container for receiving said body and providing means for resiliently supporting the body therein so as to isolate it from both vibration and shock, said container comprising a receptacle having interior dimensions larger than the exterior dimensions of the body to be supported therein, said receptacle having mounted on its interior walls a plurality of unitary body supporting units that each include a resilient element to transmit both tension and compression forces between the body and the surrounding walls of the receptacle and friction means to damp vibrations transmitted to said body, said body supporting units each having a universal pivotal connection at each end thereof such that the lines of action thereof may be adjusted, certain of said body supporting units being mounted in inwardly converging pairs on opposed walls of said receptacle and arranged such that they are disposed longitudinally of the container and arranged to have their lines of action extend in a horizontal plane passing through the center of gravity of the body supported in the container and other of said body supporting units being arranged in a plane extending transversely of the container at a location so that the lines of action of the last mentioned body supporting units are arranged to pass closely adjacent the center of gravity of the body supported in the container, and other body supporting units spaced longitudinally from each of the aforementioned body supporting units and arranged to extend transversely of the container and to converge towards the longitudinal centerline of the body, the several body supporting units limiting movement of the supported body to a predetermined amount in all directions while preventing contact between the supported body and the receptacle walls.

3. A body and a container for receiving said body and providing means for resiliently supporting the body therein so as to isolate it from both vibration and shock comprising a receptacle having interior dimensions larger than the exterior dimensions of the body to be supported therein, said receptacle having mounted on its interior walls a plurality of body supporting units that each include a resilient element to transmit both tension and compression forces between the body and the surrounding walls of the receptacle and friction means to damp vibrations transmitted to said body, said body supporting units each having a universal pivotal connection at each end thereof such that the lines of action thereof may be adjusted, certain of said body supporting units being mounted in inwardly converging pairs on opposed walls of said receptacle and arranged such that they are disposed longitudinally of the container and have their lines of action extending in a horizontal plane passing through the center of gravity of the body supported in the container and other of said body supporting units being arranged in a plane extending transversely of the container at a location so that the lines of action of the last mentioned body supporting units are arranged to pass closely adjacent the center of gravity of the body supported in the container, and still other body supporting units mounted on the container inner walls at locations spaced from the aforementioned body supporting units, said latter units being located in a plane extending transversely of the container at a point spaced longitudinally from the center of the container, said last mentioned body supporting units being arranged to converge inwardly towards the longitudinal axis of the container, the several body supporting units being adjustable to limit movement of the body supported in the container to a predetermined amount in all directions while preventing contact between the supported body and the receptacle walls.

References Cited in the file of this patent
UNITED STATES PATENTS

| | | |
|---|---|---|
| 1,766,597 | Bushnell | June 24, 1930 |
| 2,516,124 | Kishibay | July 25, 1950 |
| 2,588,682 | Wyeth | Mar. 11, 1952 |
| 2,594,586 | Ries | Apr. 29, 1952 |
| 2,613,807 | Higbee | Oct. 14, 1952 |
| 2,631,841 | Tillou et al. | Mar. 17, 1953 |
| 2,670,166 | Applegate | Feb. 23, 1954 |
| 2,700,458 | Brown | Jan. 25, 1955 |

UNITED STATES PATENT OFFICE

CERTIFICATE OF CORRECTION

Patent No. 2,817,435
December 24, 1957

John P. Butterfield

It is hereby certified that error appears in the printed specification of the above numbered patent requiring correction and that the said Letters Patent should read as corrected below.

Column 2, line 44, for "aranged" read -- arranged --; column 6, line 54, after "extend" insert -- longitudinally of --.

Signed and sealed this 11th day of February 1958.

(SEAL)
Attest:
KARL H. AXLINE

Attesting Officer

ROBERT C. WATSON
Commissioner of Patents